Figure 1:
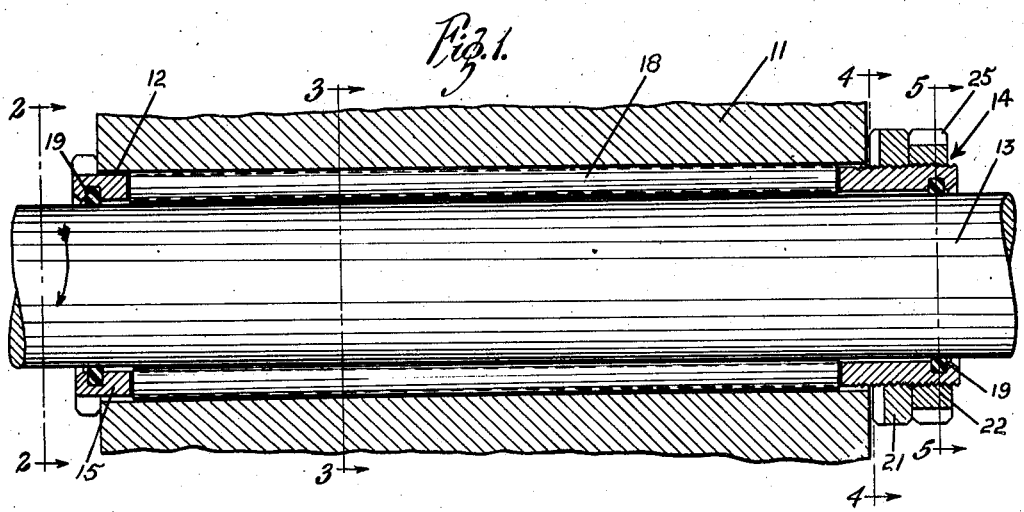
Figure 2:
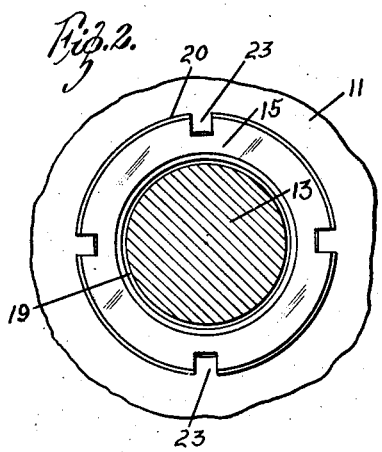
Figure 3:
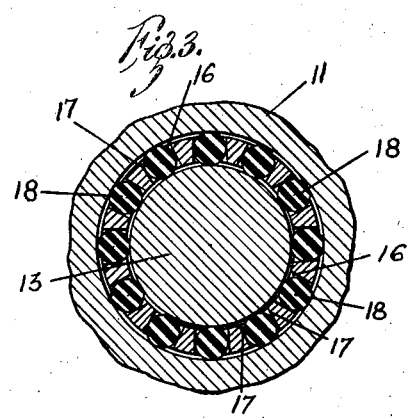
Figure 4:
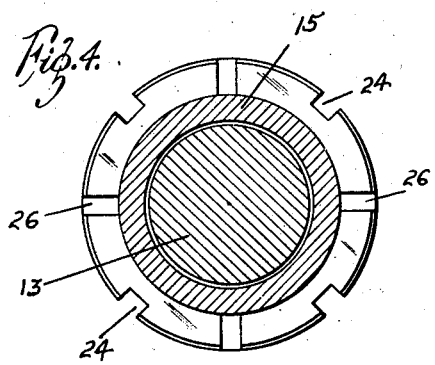
Figure 5:
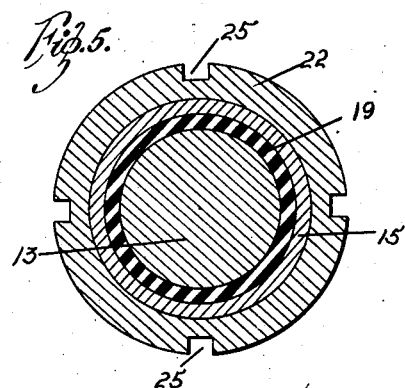

Aug. 20, 1946. W. R. FREEMAN 2,406,069

BEARING

Filed Nov. 1, 1944

INVENTOR:
WALTER R. FREEMAN,
BY P. H. Lamphere
ATTORNEY.

Patented Aug. 20, 1946

2,406,069

UNITED STATES PATENT OFFICE 2,406,069

BEARING

Walter R. Freeman, St. Louis County, Mo.

Application November 1, 1944, Serial No. 561,397

7 Claims. (Cl. 308—184)

This invention relates to bearings and more particularly to a bearing for use with a shaft which operates in a liquid containing foreign matter.

An object of the invention is to provide an improved bearing for a shaft which will be efficient in operation and have a long life with minimum shaft wear under conditions where the bearing and shaft are submerged in a liquid containing foreign matter.

Another object is to produce a shaft bearing which is so constructed that the shaft is supported on yieldable rollers which are free to roll about their own axis and also rotate bodily about the axis of the shaft.

A still further object is to produce a shaft bearing which will so operate that there will be present a self-cleansing action so that no abrasive wear will occur between it and the shaft when the bearing and shaft are submerged in a liquid containing an abrasive substance.

A further object is to produce a bearing which will be self-cleansing and self-lubricating when employed with a shaft submerged in a liquid having abrasive material suspended therein.

A more specific object is to produce an improved bearing which is especially well adapted for use as a strut bearing for boat propeller shafts.

Other objects of the invention will become apparent from the following description taken in connection with the accompanying drawing showing a preferred embodiment thereof.

In the drawing:

Figure 1 is a longitudinal sectional view of a bearing associated with a shaft and constructed in accordance with my invention.

Figures 2, 3, 4 and 5 are cross sectional views taken, respectively, on the lines 2—2, 3—3, 4—4, and 5—5 of Figure 1 and showing details of construction.

Referring to the figures in detail, the numeral 11 indicates a support member which has a cylindrical opening 12 therethrough. Extending through this opening is a shaft 13 which is of somewhat smaller diameter than the opening 12. Between the shaft and the support is positioned my improved bearing, generally indicated by the numeral 14, said bearing permitting rotation of the shaft relative to the support and also acting as a supporting medium between the shaft and support.

The bearing construction shown comprises a cylindrical cage 15 having an external diameter smaller than the diameter of the opening 12 in the support and an internal diameter greater than the diameter of the shaft 13. This cage is provided with a plurality of circumferentially spaced longitudinally extending slots 16 extending completely through the cage wall. The slots are formed with parallel side walls 17 and these walls are spaced apart a slightly greater distance than the radial distance between the cylindrical opening 12 and the cylindrical surface 13 when the axes of these two surfaces are coinciding. In each slot is positioned an elongated roller member 18 of a diameter to engage the support opening surface and the shaft surface and thus centralize the shaft in the opening. This diameter permits the roller members to roll freely in their slots.

These roller members are constructed of material to provide a yieldable surface, a suitable material being rubber, a yieldable plastic, etc. If it is desired to give the rubber greater stability, fabric may be incorporated therein. Where the rolls have a fairly large diameter it is found practical to provide the roller members with a metal core in order to control the yieldability of the roller surfaces. With the roller members positioned in the slots of the cage and the assembly positioned between the support and shaft, as shown in the various figures, the shaft will be properly supported and yet freely rotatable in the support since the roller members are free to rotate in their slots.

In addition to the roller members being free to rotate about their own axis in the cage, the cage is also free to rotate relative to the shaft and the support and about the axis of the shaft. Thus as the shaft rotates the rolling action of the roller members about their own axis will result in a rotation of the cage. The action is the same as a planetary wheel arrangement wherein the shaft is the sun wheel, the roller members the planet wheels and the cylindrical surface of the support 11 the fixed orbit wheel. There will be no sliding between the surfaces of the support and the shaft contacted by the roller members, only a rolling action.

In order that the cage will be properly centralized between the surface of the opening 12 and the shaft 13, the ends of the cage carry internal rings 19 of rubber or other suitable material which ride on the shaft and maintain the cage in proper position. The cage is prevented from shifting axially out of the opening 12 by providing one end of the cage with a flange 20 for engaging one end surface of the support 11 and the other end of the cage with threads and an annular nut 21 for cooperation with the other end of the support. An annular locking nut 22 holds the nut 21 in desired position. The flange 20 has notches 23 and nuts 21 and 22 have notches 24 (see Fig. 4) and 25 for the reception of spanner wrenches so that the nuts can be removed to free the cage for sliding movement along the shaft and out of the support opening 12. When the bearing is in proper position the cage should have only such a slight axial movement relative to the support as to be freely rotatable.

The nut 21 on its side adjacent the support is provided with radial grooves 26 so as to permit free flow of liquid from the space between the support and the shaft and around the rollers. Fluid may enter this space from the opposite end through the notches 23 in the flange. Thus when the shaft is rotating in the direction indicated by the arrow there can be a circulation of liquid through the bearing. This circulation is aided by a centrifugal pumping action caused by the rotation of the shaft and the roller members about their own axis and about the axis of the shaft. This circulation of fluid through the bearing results in a self-cleansing and lubrication action and is particularly advantageous in maintaining a very high efficiency for the bearing when the bearing is employed with a shaft operating in a liquid such as water, and particularly liquid which carries foreign material of an abrasive character such as silt and sand.

The bearing has been found to be highly efficient for use as a strut bearing for boat propeller shafts. Tests have shown that when this bearing is employed there will be little or no wear of the shaft, regardless of the amount of foreign material, such as silt and sand, in the water. This result is obtained primarily from the particular construction of the bearing. The roller members 18 have no sliding action on the support surface or the shaft surface. The foreign material is merely rolled over by the yieldable surfaces of the roller members. There is no rubbing action which is the cause of shaft wear in present strut bearings. The centrifugal pumping action resulting from the rotation of the shaft and the roller members of the bearing also prevents accumulation of sand and silt and insure adequate water lubrication.

When the roller members deteriorate and require replacement such can be very easily accomplished without the necessity of taking the cage completely off the shaft and also removing the propeller. The nuts 21 and 22 are unscrewed and the cage and roller members slid along the shaft to the left (as viewed in Figure 1) to a position where the bearing is removed from the support. The roller members may now be picked out of the slots and new ones placed in the slots. The bearing can then be placed back in operative position. Since the shaft does not become worn by the use of the bearing there is never any necessity for replacing the shaft, as must be done with the present strut bearings where an abrasive action due to turning of the shaft in a fixed surface.

Being aware of the possibility of modifications in the particular bearing structure shown and described, without departing from the fundamental principles of my invention, I do not intend that the scope of said invention be limited in any manner except in accordance with the appended claims.

Having fully described my invention, what I claim as new and desire to secure by Letters Patent of the United States is:

1. In a bearing for cooperation with a shaft and a surrounding support, a cage having circumferentially spaced elongated members, means for securing the members from relative movement, rollers having yieldable surfaces with each roller being positioned between two members and confined thereby, said rollers being of a diameter greater than the radial thickness of the members and capable of contacting the shaft and support for rolling engagement on their surfaces, radially extending slotted shoulder means carried by one end of the elongated members and a removable radially slotted nut carried by the other end of the elongated members.

2. In a bearing for use between relatively rotatable members having spaced cylindrical surfaces one of which acts as a support for the other, said members being submerged in a liquid carrying abrasive material, a cage having circumferentially spaced longitudinally extending members integrally united at their ends, said members being so shaped as to provide parallel sided slots therebetween, rollers provided with yieldable surfaces and positioned in the slots, said rollers being of greater diameter than the radial thickness of the cage members and of a size to engage the spaced cylindrical surfaces when the bearing is in position, and means carried by the cage for preventing axial shifting of the cage but permitting it to rotate relatively to the cylindrical surfaces, said last named means embodying readily removable means permitting said cage and rollers to having relative bodily axial movement with respect to the larger cylindrical surface so as to assume a position where the rollers can be freely removed in a radial direction from the slots.

3. In a bearing for use between relatively rotatable members having spaced cylindrical surfaces one of which acts as a support for the other, a cage having circumferentially spaced longitudinally extending members integrally united at their ends, said members being so shaped as to provide parallel sided slots therebetween, rollers provided with yieldable surfaces positioned in the slots, said rollers being of greater diameter than the radial thickness of the cage members and of a size to engage the spaced cylindrical members when the bearing is in position, ring means carried by each end of the cage and engaging the inner cylindrical surface for supporting the longitudinally extending members of the cage in spaced relation to the cylindrical surfaces, and means carried by the cage for preventing axial shifting of the cage but permitting it to rotate relatively to the cylindrical surfaces.

4. A bearing for use between two relative rotatable members having different size internal and external cylindrical surfaces, said bearing comprising a cylindrical cage formed with circumferentially spaced longitudinal slots, said cage having a radial thickness at the slots less than the radial space between the cylindrical surfaces, rollers positioned in the slots for rotation therein and having yieldable surfaces, said rollers being of a diameter greater than the radial thickness of the cage at the slots and engaging the cylindrical surfaces when the bearing is in position, means at the ends of the cage to centralize the cage between the cylindrical surfaces, and shoulder means on the ends of the cage for engagement with shoulders on one of the members and thereby limit axial movement of the cage with respect to the members, said shoulder means being slotted to permit flow of fluid through the cage and around the rollers.

5. A bearing for use between two relative rotatable members having different size internal and external cylindrical surfaces, said bearing comprising a cylindrical cage formed with circumferentially spaced longitudinal slots, said cage having a radial thickness at the slots less than the radial space between the cylindrical surfaces, rollers positioned in the slots for rotation therein and having yieldable surfaces, said rollers being of a diameter greater than the radial thickness of the cage at the slots and engaging the cylindrical surfaces when the bearing is in position, yieldable rings at the ends of the cage to centralize the cage between the cylindrical surfaces, and shoulder means on the ends of the cage for engagement with shoulders on the member having the internal cylindrical surface and thereby limit axial movement of the cage with respect to the members, one of said shoulder means being removable.

6. A bearing for use between two relative rotatable members having different size internal and external cylindrical surfaces, said members being submerged in a liquid containing abrasive material, said bearing comprising a cylindrical cage formed with circumferentially spaced longitudinal slots, rollers positioned in the slot for engaging the cylindrical surfaces, said rollers being made from rubber or like yieldable material and capable of free rotary movement about their axes and said cage being arranged for rotary movement relative to both cylindrical surfaces, and means on the ends of the cage including a removable member for limiting axial movement thereof during operation.

7. A bearing for use between two relatively rotatable members having different size internal and external surface, a cylindrical cage provided with longitudinal slots having parallel sides, rubber rollers positioned in the slots and of a diameter greater than the thickness of the cage at the slots, said rollers being free to rotate in the slots when engaging the cylindrical surfaces of the relatively rotatable members, yieldable rings on the ends of the cage for supporting the cage in spaced relation between the cylindrical surfaces, means providing an outwardly extending shoulder on one end of the cage, and an annular nut on the other end of the cage.

WALTER R. FREEMAN.